3,413,383
VIBRATORY COMPACTION METHOD FOR THE FABRICATION OF CERAMIC NUCLEAR FUEL ELEMENTS

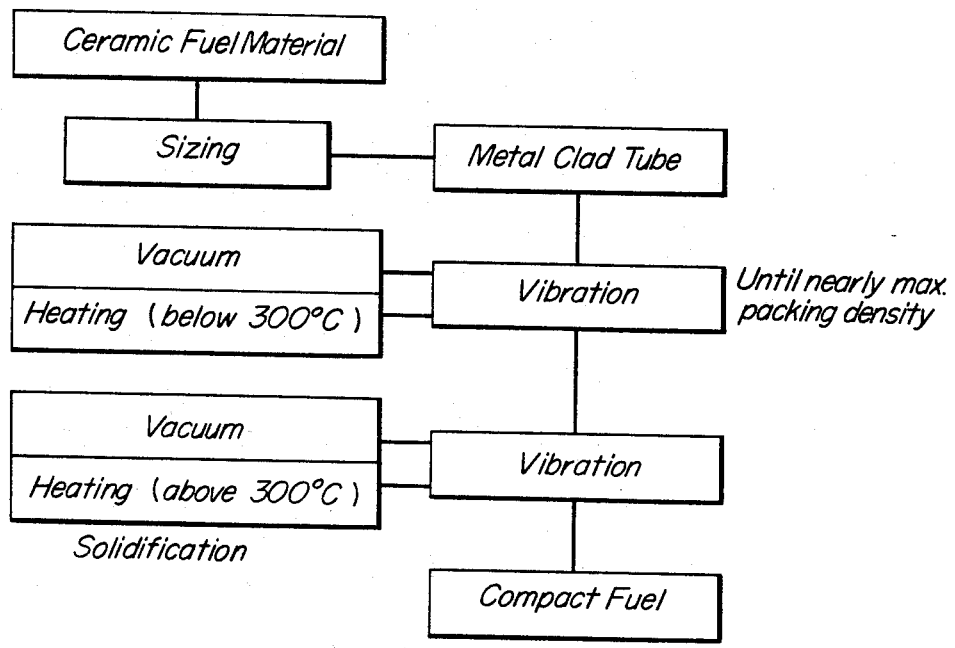
Flow Diagram of Operation

Yasuo Hirose and Seiji Takeda, Hitachi-shi, Japan, assignors to Hitachi, Ltd., Tokyo, Japan, a corporation of Japan
Filed Oct. 12, 1965, Ser. No. 495,346
Claims priority, application Japan, Oct. 28, 1964, 39/60,772
4 Claims. (Cl. 264—.5)

ABSTRACT OF THE DISCLOSURE

The present disclosure relates to a method for solidifying ceramic nuclear fuel powders which comprises introducing a ceramic nuclear fuel powder into a metal cladding tube, compacting said powder by reducing the pressure in the cladding tube and heating the powder to a temperature less than its sintering temperature, e.g., less than about 300° C., while concurrently vibrating said powder until a maximum packed density is achieved and further heating the cladding tube to a temperature sufficient to solidify the packed ceramic nuclear fuel powder, e.g., higher than about 300° C., but not so high as to be detrimental to the cladding tube.

---

This invention relates to a method for the fabrication of ceramic nuclear fuel elements particularly from uranium dioxide powder.

The vibration packing method is known in the fabrication of nuclear fuel elements in which suitably ground powders of uranium dioxide are further ground to powders having such a particle size distribution that the grain gaps are substantially minimized when they are packed. These powders are then packed into a metal cladding tube at a high density through the application of vibration or impact. Alternatively powders of uranium dioxide which have been previously compacted at a high density are packed as they are into tubes in the same manner as described above.

According to the above method, since the desired fuel elements can be produced very easily when compared with the well known pellet sintering method, it has the advantage of reducing the production cost of fuels. However, the following disadvantages have been noted:

(1) The packed density of the fuel is relatively low.
(2) The volatile impurities such as, for example, $H_2O$, $H_2$, $N_2$, $CO$, $CO_2$ and the like are adsorbed in great amounts in the powdered ceramic nuclear fuel materials.
(3) If a cladding tube should be ruptured in a nuclear reactor, there is created the hazard that fuel materials may be washed away by the coolant. Thus, the stability of surface of fuel rods in fuel elements produced by the conventional method is inferior.

In order to eliminate disadvantages (1) and (2) above, the present invention proposes an improved vibration packing method wherein powders of a nuclear fuel are charged into a metal cladding tube and the pressure in the tube containing the ceramic powders is reduced while they are heated to the temperature up to about 300° C. during continual compaction due to vibration or impact. Accordingly, the fuel is packed with a high density.

According to the method of the present invention, high packed density can be obtained and at the same time adsorbed materials in the uranium dioxide powders can also be removed.

In the present application, ceramic nuclear fuel elements mean structural materials consisting essentially of a metal cladding tube and powdered uranium dioxide packed densely therein.

According to the method proposed by the present invention, when the vibration packing was carried out by heating the metal cladding tube at a temperature above about 300° C., it was found that the packed density attained was lower than that obtained at room temperature. When the vibration packing was carried out while further raising the heating temperature above about 400° C., the packed density attained was still very low. In this situation, uranium dioxide powders packed in a metal cladding tube stuck to each other and could not be readily removed from the metal cladding tube after packing. However, where the vibration method was carried out at room temperature or with heating at the temperature below about 300° C., no sticking between the powdered particles was noticed. Even if a fuel rod, once packed by vibration to the maximum packed density, was heated, for example, to a temperature up to about 500° C., the phenomenon causing the uranium dioxide powders to stick to each other was not observed. However, in order to adhere powdered uranium dioxide particles to each other so that the surface of the powdered uranium dioxide may be stabilized, the metal cladding tube must be heated to such a high temperature that the tube is subjected to injury.

Since such high temperatures must be avoided because they will injure the metal cladding tube disadvantage (3) referred to in column 1 of the specification can not be solved by the conventional method.

The object of the present invention is to provide a method for the production of ceramic nuclear fuel elements wherein the disadvantages of (1), (2) and (3) discussed above can all be solved at the same time.

It is known that particle groups subjected to vibration cause relative motions between them due to the constrained forces of the particle system. Thus it will be readily understood that friction heat is generated at the surface of the particles. The generation of this friction heat is evident from the fact that the surface temperature of the fuel rod subjected to vibration often reaches more than 300° C. without heating the fuel rod from outside. Therefore, it can be understood that the surface temperature of each particle in the fuel rod will have a much higher temperature.

In view of the above mentioned facts, it can be presumed that if the particle system is heated from the outside, the surface temperature of the particles in a fuel rod subjected to vibration could be elevated to such a high temperature that the powdered uranium dioxide would be readily plasticized. Moreover, since the heat generated is primarily due to the friction of the particle system itself, it can be presumed that it may not be necessary to heat the cladding tube from outside to a temperature so high as to injure itself. Consequently, such a fuel rod may be produced in which uranium dioxide powders having an excellent surface stability are stuck to each other without subjecting the metal cladding tube to thermally deleterious effects.

According to the present invention, a fuel rod having a high packed density can be obtained wherein powdered particles of fuel, for example uranium dioxide are adhered to each other by first packing with vibrations the powdered uranium dioxide into a metal cladding tube while it is heated at a temperature below about 300° C. to increase the packed density and then elevating the heating temperature up to about 700° C. with continual vibrations without lowering the packing density. However, the heating temperature during the second heating stage, i.e., after the preliminary vibration packing at a temperature below about 300° C., must not be so high as to injure the metal cladding tube. For example, in the case where a cladding tube is made of stainless steel, the heating temperature is less than 500° C. and in the case where it is made of a zinc alloy, the heating temperature is below 400° C.

The present invention is concerned with the production of ceramic nuclear fuel elements by charging ceramic nuclear fuel powders into a metal cladding tube and packing the powders to a high density due to vibration and/or impact characterized in that the ceramic nuclear fuel powders are first packed until they are in a state of substantially maximum packed density by reducing the pressure inside the metal cladding tube and heating the powders to a temperature below about 300° C. with continual vibrations. The fuel powders are then further heated to a temperature higher than 300°C. but less than that temperature which would be detrimental to the cladding tube. The vibrations or impacts are continued during the second heating stage to further pack the powders.

The vibration or impact force given to the powders are by means of periodic or antiperiodic wave form vibrations. In the method of the present invention, it has been definitely shown that so-called random waves, i.e., antiperiodic wave form vibrations are generally suitable. The purpose of reducing the pressure in the cladding tube is to promote the removal of impurities adsorbed in the powders, to increase the packing property and to insulate the thermal effects upon the powders and the cladding tube at the same time. Therefore, it is preferable to maintain the reduced pressure even after the preliminary packing operation has been finished. The processes of reducing the pressure in the cladding tube and heating a powder to the temperature below about 300° C. can be combined in any order. For example, methods can be employed wherein the steps of reducing the pressure and heating to a temperature below about 300° C. are carried out at the same time; where vibration packing is carried out at normal temperature and pressure to attain almost a maximum packed density, and then evacuation is started with heating at a temperature below about 300° C.; and where vibration packing is carried out at normal temperature while reducing the pressure and then heating is started at a temperature below about 300° C. while maintaining the reduced pressure. In any case, the reduction of pressure in the preliminary packing operation is continued until the packed density approaches as near as possible to a maximum. The degree of reduced pressure used in the present invention is sufficient to achieve the above mentioned objects. Thus, the pressure may be sufficient if the removal of impurities adsorbed is promoted and the deleterious effects upon the powder and the cladding tube are prevented. Therefore, high vacuum is not required in practice. For example, a pressure as low as about $10^{-2}$ mm. Hg is enough to obtain the above objects.

After preliminary operation has been finished, the powders stick to each other to establish the surface stability of a fuel rod due to the heat generated by friction of the powders themselves by heating to a temperature not so high as to injure the cladding tube with continual vibrations or impacts. At this time, the heating temperature from outside should be adjusted so that the cladding tube is not injured if there is heat generated by friction of the powders themselves.

The method of the present invention can be more fully understood by referring to the drawing and is further illustrated in more detail by the following examples.

Example 1

200 grams of ground powders of fused uranium dioxide containing three groups of grain size distribution ($-6+8$ mesh), $-35+65$ mesh and $-325$ mesh were charged into a stainless steel cladding tube having an outer diameter of 12.0 mm., a thickness of 0.6 mm. and a length of 500 mm. A push rod was inserted into the tube so as to prevent the powders from scattering from the upper end of the packed layer. Then the tube was mounted on a moving table and vibrations having an acceleration of 75,000 cm./sec.$^2$ with a displacement of 0.015 mm. were commenced and continued for 20 minutes to form a moulding having 87% of the theoretical density. Next, an adapter for reducing the pressure inside the cladding tube was fitted to the upper end of the cladding tube to reduce the pressure, and those parts of the tube where powdered uranium dioxide was packed were heated from the outside of the cladding tube when the inner pressure of the tube became lower than $10^{-2}$ mm. Hg.

Vibrations having an acceleration of 38,000 cm./sec.$^2$ and a displacement of 0.01 mm. were begun while the cladding tube was heated from outside for 20 minutes so that the surface temperature of the tube reached 700° C. The tube was then cooled to room temperature.

Though the density after cooling had the same 87% of the theoretical density as before heating, the packed powders of uranium dioxide did not crumble and fall even when the cladding tube was inverted and beaten because they were in a state of adhesion.

Example 2

After a cladding tube was charged with powdered uranium dioxide in the same manner as in Example 1 and fitted to a moving table, an adapter for reducing the pressure was provided. The pressure in the cladding tube was reduced to less than $10^{-2}$ mm. Hg and then the tube was heated from outside. When the cladding tube was heated to the temperature of 100° C., vibrations having a displacement of 0.015 mm. and an acceleration of 75,000 cm./sec.$^2$ were begun and continued for 20 minutes to obtain a packing density of 88% of the theoretical density. Subsequently, the surface temperature of the cladding tube was raised to 700° C. by increasing the heating temperature. After vibrations having a displacement of 0.01 mm. and an acceleration of 38,000 cm./sec.$^2$ were commenced and continued for 20 minutes, the tube was cooled to room temperature.

Then density after cooling was the same 88% of the theoretical density as before heating, but the packed powders of uranium dioxide did not crumble and fall even if the cladding tube was inverted and beaten because they were in a state of adhesion.

In the above examples, by displacement is meant amplitude of motions in the case of periodic vibration waves.

As illustrated above, the fuel elements produced by the method of the present invention are high in packed density and the impurities adsorbed in the uranium dioxide powders are reduced. Therefore, the hazard that the cladding tube pressure of the fuel elements will increase is substantially reduced.

Since the powders of uranium dioxide readily stick to each other, the fuel rod has the excellent property that even if the cladding tube should be ruptured in a nuclear reactor, the hazard that the fuel rod would be washed away by coolant is negligible.

It will be evident that the methods of the present invention are applied not only to uranium dioxide, but also to other fissionable materials as the nuclear fuel powders.

What we claim is:

1. A method for the manufacture of ceramic nuclear fuel elements of high density which comprise introducing a ceramic nuclear fuel powder into a metal cladding tube, compacting the powder by vibrating it while concurrently reducing the pressure in the cladding tube and heating the powder to a temperature less than about 300° C. until an approximate maximum packed density is achieved, and then solidifying the packed powder by further heating the cladding tube with concurrent vibration to a temperature higher than about 300° C. but not so high as to be detrimental to said cladding tube.

2. The method of claim 1, wherein the reduced pressure in the cladding tube is maintained throughout the process.

3. The method of claim 2, wherein the pressure is about $10^{-2}$ mm. Hg.

4. The method of claim 1, wherein the ceramic nuclear fuel powder is uranium dioxide.

References Cited

UNITED STATES PATENTS

| | | | |
|---|---|---|---|
| 1,896,854 | 2/1933 | Taylor | 75—225 |
| 2,198,612 | 4/1940 | Hardy | 264—71 |
| 2,725,288 | 11/1955 | Dodds et al. | 264—.5 |
| 2,818,339 | 12/1957 | Dodds | 75—225 |
| 2,893,102 | 7/1959 | Maxwell et al. | 264—69 |
| 3,141,911 | 7/1964 | Hauth | 264—.5 |
| 3,142,533 | 7/1964 | Accary et al. | 75—255 |

FOREIGN PATENTS 926,136  5/1963  Great Britain.

CARL D. QUARFORTH, *Primary Examiner.*

R. L. GRUDZIECKI, *Assistant Examiner.*